United States Patent Office 3,565,925
Patented Feb. 23, 1971

3,565,925
PROCESS FOR FORMYLATING ACID-SENSITIVE ALCOHOLS
Richard Frederick Stockel, Somerville, N.J., assignor to American Cyanamid Company, Stamford, Conn., a corporation of Maine
No Drawing. Filed May 6, 1968, Ser. No. 727,054
Int. Cl. C07c *169/54*
U.S. Cl. 260—397.2                     7 Claims

ABSTRACT OF THE DISCLOSURE

A method for formylation of acid-sensitive alcohols which comprises reacting the alcohols with a formamide compound in the presence of a protic acid having a pKa value of five or less.

---

This invention relates to the formylation of the hydroxy groups of acid-sensitive organic hydroxy compounds. More particularly, the invention relates to a method for preparing formate esters by reacting a formamide compound with an acid-sensitive organic hydroxy compound in the presence of a protic acid having a pKa value of five or less.

Formate esters of organic hydroxy compounds are normally prepared by reacting the hydroxy compound with formic acid. However, this method is not suitable for many acid-sensitive organic hydroxy compounds which undergo a carbonium ion type of molecular rearrangement in the presence of strong acids. For example, in the presence of formic acid, a strong acid, pinacol undergoes rearrangement with formation of pinacolone.

Also, it is known that organic hydroxy compounds may be formylated by reaction with formamides in the presence of Lewis acids, i.e., compounds such as aluminum chloride, phosgene, phosphorus oxychloride, phosphorus oxybromide, boron trifluoride, and the like. See T. E. Stevens, "Formylation of Alcohols With Iodine Pentafluoride and Dimethylformamide," Chemistry and Industry, Aug. 16, 1958, page 1,090. However, the foregoing method suffers severe limitations including the requirement of an anhydrous reaction medium and comparatively expensive starting materials. Moreover, the reaction rates are slow and the formate ester yields tend to be low.

It is therefore an object of this invention to provide a convenient and economical method for formylating certain acid-sensitive alcohols.

A further object is to provide a process for obtaining formylation products of acid-sensitive alcohols in relatively quick time and good yield.

These and other objects of my invention will become apparent as the description thereof proceeds.

It has now been discovered that formate esters of acid-sensitive organic hydroxy compounds can be prepared easily and economically without the foregoing disadvantages and, particularly, with the requirement of an anhydrous reaction medium. The method of the present invention offers the further advantage of homogeneity of reaction mixture.

Broadly, the method of the invention comprises reacting an acid-sensitive organic hydroxy compound with a formamide compound in the presence of effective amounts of a protic acid according to the generalized equation:

(1) 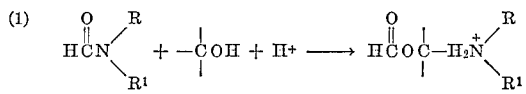

In this reaction the formamide compound is protonated by the protic acid thereby activating the formyl group, —CHO, for attachment to the

group of the hydroxy compound.

By protic acid is meant a compound which will donate a proton to the formamide compound, the latter compound thus being known as the conjugate base. Such acids are also known as Bronsted acids as distinguished from a so-called Lewis acid which is conventionally employed in an anhydrous reaction medium.

Typical protic acids include the common inorganic mineral acids such as sulfuric, hydrochloric, hydrobromic, hydriodic, phosphoric, nitric, and the like. Also included are the organic acids such as the carboxylic acids, both monocarboxylic and polycarboxylic, e.g., acetic, acetoacetic, phenylacetic, thioacetic, benzoic, o-bromobenzoic, o-chlorobenzoic, n-butyric, iso-butyric, n-caproic, iso-caproic, chloroacetic, chlorobutyric, heptanoic, n-valeric, octanoic, oxalic, malonic, adipic, ascorbic, citric and the like, and organic sulfonic acids such as benzenesulfonic, para-toluene-sulfonic and the like. In general, the useful protic acids are strong acids, i.e., those which exhibit an ionization constant of at least $10^{-6}$ in water at about 25° C. This corresponds to a pKa value of the acid of 5 or less. The mineral acids are particularly preferred.

The acid-sensitive organic hydroxy compound reactants are certain compounds which have at least one

group wherein the atoms directly attached to the carbon atom are hydrogen or carbon including combinations of hydrogen and carbon.

Acid-sensitive hydroxy compounds include secondary alcohols such as 3-methyl-2-butanol; tertiary alcohols such as 2-methyl-2-propanol; beta,beta-dialkyl primary alcohols such as 2,2-dimethyl-1-propanol; beta,gamma-unsaturated alcohols such as crotyl alcohol and 1,1-dimethylallyl alcohol; cyclopropanemethanol; sterols such as chlosterol and friedelanol; 1,2-glycols such as pinacol; and the like.

Formamide compounds useful in the method of the invention include those of the formula:

wherein R and $R^1$ are selected from the group consisting of hydrogen, alkyl, particularly alkyl having from one to about twenty carbon atoms inclusive, and radicals which together with the nitrogen atom of said formamide compound form a heterocyclic ring of from 5 to 7 atoms inclusive. The foregoing heterocyclic ring may contain the single nitrogen atom with the rest of the ring being carbyl, two nitrogen atoms with the rest of the ring being carbyl, or combinations of one or two nitrogen atoms with one oxygen atom, the remaining atoms being carbyl. The heterocyclic ring may also contain inert side chains such as lower alkyl groups, i.e., alkyl groups containing from 1 to 7 carbon atoms.

Typical of such formamide compounds are N-alkyl formamides, e.g., N-methylformamide, N-ethylformamide and the like; N,N-dialkyl formamides, e.g., N,N-dimethylformamide, N,N-diethylformamide and the like; and N-heterocyclic formamides, e.g., 1 - formylpiperidine, 1-formyl-2-methylpiperidine, 4 - formylmorpholine, 1-formylpyrrolidine, 1-formyl-3-methylpyrrolidine, 1-formylaziridine and the like.

The aforementioned acids, organic hydroxy compounds and formamides may each be employed singly or in mixtures of two or more.

The formamide compound and the organic hydroxy compound are employed in proportions sufficient to provide at least 1 mole of the formamide compound per hydroxy group to be formylated. However, it is advantageous to use an excess of the formamide compound over the theoretical number of moles required to react with the hydroxy compound since the formamide compound is generally a solvent for the organic hydroxy compound. Thus, from about 1 to 10 moles inclusive, preferably from about 2.5 to 5.0 moles inclusive, of the formamide compound will be used per hydroxy group of the organic hydroxy compound.

In theory, at least one equivalent of the protic acid will be employed per hydroxy group to be formylated. However, excess acid is recommended and generally from about 1 to 10 equivalents inclusive, preferably from about 2.5 to 5.0 equivalents inclusive, will be used per hydroxy group to be formylated.

The formylation is conveniently effected by dissolving the formamide compound and the acid-sensitive organic hydroxy compound in a suitable reaction medium, adding the protic acid and heating until the reaction is essentially complete. Sufficient water should be present in the reaction mixture for ionization of the protic acid and for fluidity. The water preferably is added as an aqueous solution of the protic acid but it may also be added separately. Conventional water-miscible inert organic solvents such as dioxane may also be employed if desired but reaction readily occurs without other solvents. The reaction temperature will depend upon the particular reactants as well as the reaction medium. From about 75° C. to 200° C. at atmospheric pressure will be effective. Preferably, the reaction is conducted at reflux temperature. Vapor phase chromatography or other conventional means may be employed to determine when the reaction is essentially complete.

The formate ester products are isolated by conventional means as by pouring the reaction mixture into water and filtering off the product. If the product is water-soluble, it can be separated by distillation or by extraction with a water-immiscible organic solvent.

The amount of water or other solvent in the reaction mixture is not critical. Likewise, the sequence of addition of reactants and protic acid is not critical. For example, the protic acid may be added as an aqueous solution, or a highly concentrated acid may be added to a reaction mixture containing water. The process may also be conducted at atmospheric, sub-atmospheric or super-atmospheric pressures and may be batch, semi-continuous or continuous.

The greatly improved results that can be obtained by formylating acid-sensitive hydroxy compounds in accordance with the process of this invention can be demonstrated with pinacol, which is 2,3-dimethyl-2,3-butanediol. When pinacol is reacted with formic acid in a conventional manner, the resulting product contains about 30% of the rearrangement product of pinacol, namely pinacolone. When pinacol is formylated by reaction with dimethylformamide and hydrochloric acid, the diformate product contains not more than 6% of pinacolone.

The facile preparation of formate esters according to the present invention is a surprising result in view of the knowledge that "C" formylation (direct attachment of a formyl group, —CHO, to carbon atom of substrate) proceeds with ease in the presence of a Lewis acid but substantially not at all in the presence of a protic acid. It might be thought that the same result would obtain in "O" formylation (attachment of a formyl group, —CHO, to oxygen atom of hydroxy group of an organic hydroxy compound), but such is not the case. Not only does "O" formylation occur readily in the presence of a protic acid but in many preparations the yields of formate ester are substantially improved over yields from reaction in the presence of a Lewis acid. This unexpected result together with other advantages such as described above evidences the unobviousness of the method of the invention.

The following Examples are given to illustrate the invention and are not intended to be limitative.

EXAMPLE 1

A mixture of 23.6 g. (0.2 mole) of pinacol, 70 ml. of dimethylformamide and 50 ml. of 33% aqueous hydrochloric acid was heated at the reflux temperature for three hours. The reaction mixture was poured into 200 ml. of saturated aqueous sodium chloride solution. The crude product was chiefly the diformate of pinacol with less than 6% of pinacolone present.

EXAMPLE 2

A mixture of 23.6 g. (0.2 mole) of pinacol and 50 ml. of 90% formic acid was heated at the reflux temperature for three hours. The crude diformate product contained about 30% of pinacolone.

EXAMPLE 3

When the procedure of Example 1 was followed with substitution of an equivalent amount of cholesterol for the pinacol, the product was chiefly the formate of cholesterol.

EXAMPLE 4

When the procedure of Example 1 was followed with substitution of an equivalent amount of cyclopropanemethanol for the pinacol, the product was chiefly the formate of cyclopropanemethanol.

While certain specific examples and preferred embodiments of the invention have been set forth, it will be understood that this is solely for illustration and that various changes and modifications may be made in the invention without departing from the spirit of the disclosure or the scope of the appended claims.

I claim:

1. A method of formylating the hydroxy groups of a sterol which comprises reacting, in the presence of effective amounts of a protic acid, (1) a sterol having at least one

group wherein the atoms directly attached to the carbon atom are selected from the group consisting of hydrogen and carbon, and (2) a formamide of the formula

wherein R and $R^1$ are selected from the group consisting of hydrogen, alkyl and radicals which together with the nitrogen atom of said formamide form a heterocyclic ring of from 5 to 7 atoms.

2. The method of claim 1 wherein said formamide compound is a dialkyl formamide and said protic acid has an ionization constant in water of at least $10^{-6}$ at about 25° C.

3. A method, as in claim 1, of preparing the formate ester of cholesterol which comprises reacting cholesterol and dimethylformamide in the presence of aqueous hydrochloric acid.

4. The method of claim 1 wherein the amount of formamide is from about 1 to 10 moles per hydroxy group of said hydroxy compound.

5. The method of claim 1 wherein the amount of protic acid is from about 1 to 10 equivalents per hydroxy group of said hydroxy compound.

6. The method of claim 1 wherein said reaction is conducted at elevated temperature of from about 75° to 200° C.

7. The method of claim 1 wherein the amount of formamide is from about 2.5 to 5 moles and the amount of protic acid is from about 2.5 to 5 equivalents, the amounts being per hydroxy group in said hydroxy compound.

References Cited

UNITED STATES PATENTS

| | | | |
|---|---|---|---|
| 1,584,907 | 5/1926 | Trusler | 260—488 |
| 2,617,821 | 11/1952 | Soloveichik | 260—488 |
| 2,946,810 | 7/1960 | Oliveto et al. | 260—397.45 |
| 3,114,750 | 12/1963 | Kirk et al. | 260—239.55 |

ELBERT L. ROBERTS, Primary Examiner

E. G. LOVE, Assistant Examiner

U.S. Cl. X.R.

260—488